United States Patent
Hoshika

(10) Patent No.: US 11,843,854 B2
(45) Date of Patent: Dec. 12, 2023

(54) DISPLAY CONTROL DEVICE AND DISPLAY CONTROL METHOD

(71) Applicant: CANON KABUSHIKI KAISHA, Tokyo (JP)

(72) Inventor: Hiroyuki Hoshika, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/574,706

(22) Filed: Jan. 13, 2022

(65) Prior Publication Data

US 2022/0247932 A1    Aug. 4, 2022

(30) Foreign Application Priority Data

Feb. 2, 2021 (JP) ................. 2021-014917

(51) Int. Cl.
*H04N 23/63* (2023.01)
*H04N 7/01* (2006.01)
*H04N 23/62* (2023.01)
*H04N 23/667* (2023.01)

(52) U.S. Cl.
CPC ............ *H04N 23/63* (2023.01); *H04N 7/012* (2013.01); *H04N 23/62* (2023.01); *H04N 23/667* (2023.01)

(58) Field of Classification Search
CPC ...... H04N 23/63; H04N 23/667; H04N 23/62; H04N 7/012
See application file for complete search history.

(56) References Cited

U.S. PATENT DOCUMENTS

| 10,440,317 | B2 | 10/2019 | Matsumoto et al. |
| 11,356,603 | B2* | 6/2022 | Omori ............ H04N 23/665 |
| 2016/0021328 | A1* | 1/2016 | Shen ............... H04N 7/01 |
| | | | 348/448 |

FOREIGN PATENT DOCUMENTS

JP    2020-057974 A    4/2020

* cited by examiner

*Primary Examiner* — Twyler L Haskins
*Assistant Examiner* — Fayez A Bhuiyan
(74) *Attorney, Agent, or Firm* — Carter, DeLuca & Farrell LLP

(57) ABSTRACT

A display control device for controlling a display panel is switchable between a first display mode in which a video is displayed at a first vertical resolution and a second display mode in which a video is displayed at a second vertical resolution that is lower than the first vertical resolution. The display control device comprises at least one memory and at least one processor which function as: a control unit configured, in a first case where a first operation is received in the first display mode, to change to the second display mode after changing a display update timing in the first display mode, and in a second case where a second operation is received in the second display mode, to change the display update timing after changing to the first display mode.

16 Claims, 6 Drawing Sheets

DISPLAY CONTROL DEVICE AND DISPLAY CONTROL METHOD

BACKGROUND OF THE INVENTION

Field of the Invention

The present invention relates to a display control device and a display control method.

Description of the Related Art

An imaging device such as a digital camera is generally capable of continuous imaging (continuous shooting) for acquiring static images continuously. The imaging device is capable of displaying a video of a captured object on a display device in real time (live view) while continuously capturing static images of the object. To realize this, during continuous imaging, the imaging device reads two different images, namely an image (a display image; a video) to be displayed on the display device and a static image (a recording image) to be recorded. The imaging device records the static image while displaying the display image on the display device in real time. Further, to make the time between acquisition (reading) and display of the display image uniform, the imaging device is also capable of controlling an exposure timing and a display update timing.

In Japanese Patent Application Publication No. 2020-57974, an imaging device makes intervals between the centers of gravity (centers) of exposure operations uniform by controlling the exposure timing during continuous imaging. Further, with respect to the display image, the imaging device controls the display update timing so as to make the time between exposure and display on the display device uniform. Thus, even during continuous imaging, the movement amount of the object displayed on the display device is less likely to become discontinuous. As a result, the possibility that movement by the object on the display image will produce a feeling of discomfort in the user can be reduced.

Here, the timing at which the user issues an instruction to start continuous shooting is typically an arbitrary timing. Further, it is important to ensure that the time from the start of continuous shooting to acquisition of a static image is uniform regardless of the continuous shooting start timing so that when the user shoots a moving object, the moving object is captured with the intended composition. Furthermore, the time from acquisition of the display image to display thereof on the display device is preferably constant for each frame.

In Japanese Patent Application Publication No. 2020-57974, however, the exposure timing and the display update timing are controlled without considering the fact that the timing at which the user issues an instruction to start continuous shooting is arbitrary. Meanwhile, a display update rate (the frame rate) may be modified in response to the instruction to start continuous shooting. Depending on the timing of the instruction to start continuous shooting, therefore, variation may occur in the time from the instruction to start continuous shooting to acquisition of a static image or the time from acquisition of the display image to display thereof on the display device due to modification of the display update rate. As a result, a difference may occur between the image that the user intended to capture and the static image that is actually captured, making it impossible for the user to perform image capture as intended.

SUMMARY OF THE INVENTION

An object of the present invention is to provide a technique with which a user can perform image capture as intended, without feeling discomfort.

An aspect of the present invention is: a display control device for controlling a display panel that is switchable between a first display mode in which a video is displayed at a first vertical resolution and a second display mode in which a video is displayed at a second vertical resolution that is lower than the first vertical resolution, the display control device comprising at least one memory and at least one processor which function as: a control unit configured, in a first case where a first operation is received in the first display mode, to change to the second display mode after changing a display update timing in the first display mode, and in a second case where a second operation is received in the second display mode, to change the display update timing after changing to the first display mode.

An aspect of the present invention is: a display control method for controlling a display panel that is switchable between a first display mode in which a video is displayed at a. first vertical resolution and a second display mode in which a video is displayed at a second vertical resolution that is lower than the first vertical resolution, the display control method comprising: a step for changing to the second display mode after changing a display update timing in the first display mode in a first case where a first operation is received in the first display mode; and a step for changing the display update timing after changing to the first display mode in a second case where a second operation is received in the second display mode.

Further features of the present invention will become apparent from the following description of exemplary embodiments with reference to the attached drawings.

DESCRIPTION OF THE EMBODIMENTS

First, display modes (display update rates and display methods) of a display device will be described below as basic technology.

As display update rates (frame rates) of a display device, 59.94 fps and an enhanced display update rate of 119.88 fps are generally available. Further, a "progressive method", in which an image is displayed using all of the scan lines, and an "interlacing method", in which an image is displayed using half of the scan lines (at half the vertical resolution)

are typically available as display methods used at the 119.88 fps display update rate. In the "interlacing method", an image is displayed by alternating at high speed and at equal time intervals between display using the odd-numbered. lines of the display device and display using the even-numbered lines thereof. In so doing, a moving image can be displayed smoothly, and there appears to be little deterioration in the resolution.

Here, in order to fix the time from acquisition of the display image to display thereof on the display device in each imaging operation, the display start timing may be modified to the start timing of continuous imaging. In this case, however, when the "interlacing method" is used at the start timing of continuous imaging, the display time of either the odd-numbered. lines or the even-numbered lines becomes longer than the display time of the other. As a result, flickering may occur on the display device.

[First Embodiments]: A preferred embodiment of the present invention will be described in detail below with reference to the attached figures. Note that in the following embodiment, a case in which a digital camera capable of continuously shooting static images is used as the display device will be described as an example. Note that the display device is not limited to a digital camera, and a mobile terminal such as a smartphone, for example, may be used instead. This embodiment can also be realized as a display control device for controlling a display device of this type.

Figure 1:
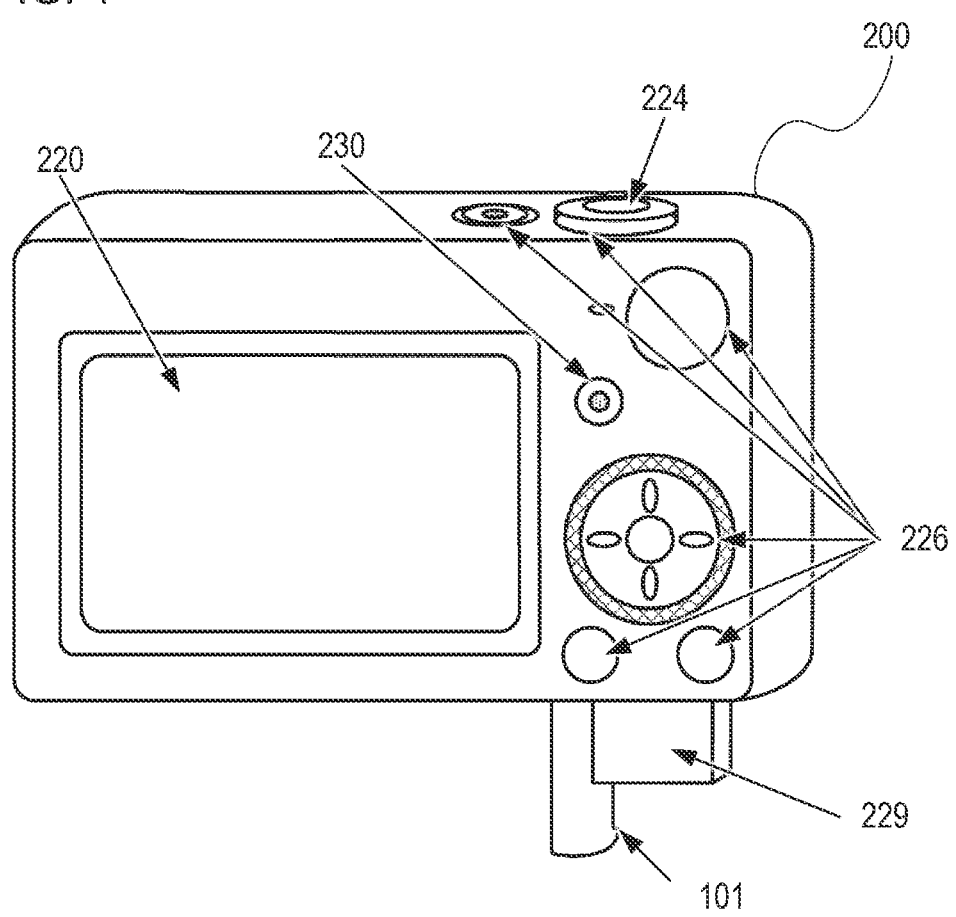
FIG. 1 is an exterior view of a digital camera according to a first embodiment.

<Configuration of Display Device>: FIG. 1 is a back view (an external view) of a digital camera 200 serving as the display device (the display control device) according to this embodiment. The digital camera 200 includes a display unit 220, a shutter button 224, a moving image shooting button 230, an operating unit 226, an external recording medium 229, and a lid 101.

The display unit 220 (display panel) displays images and various information. The display unit 220 includes a TFT liquid crystal display (a Thin Film Transistor LCD) or the like. The display unit 220 can display an image (a display image) by illuminating a plurality of scan lines (odd-numbered lines and even-numbered lines). The display unit 220 is capable of both image display according to the "interlacing method" and image display according to the "progressive method", as described above.

The shutter button 224 is a button that is pressed by a user (a user operation) in order to instruct to shoot of a static image (issue an instruction to shoot a static image). The moving image shooting button 230 is a button that is pressed by the user (a user operation) in order to issue an instruction to shoot a moving image.

The operating unit 226 includes various operating members such as switches and buttons for receiving various operations from the user. For example, the operating unit 226 includes a power supply switch for switching a power supply of the digital camera 200 ON and OFF, a mode switch for switching an operating mode of the digital camera 200, and a menu button for performing menu settings on the digital camera 200. The operating unit 226 also includes a 4-direction key button for issuing menu and setting instructions on a screen displayed on the display unit 220, and so on. The operation modes switched using the mode switch include a continuous imaging mode (a mode enabling continuous imaging, in which the user continuously shoots static images by fully pressing the shutter button 224), for example. In the continuous imaging mode, the user can perform continuous imaging while varying the attitude of the digital camera 200 leftward, rightward, upward, and downward.

The external recording medium 229 is a recording medium (a storage medium) such as a memory card or a hard disk. The lid 101 is a lid for housing the external recording medium 229.

Figure 2:
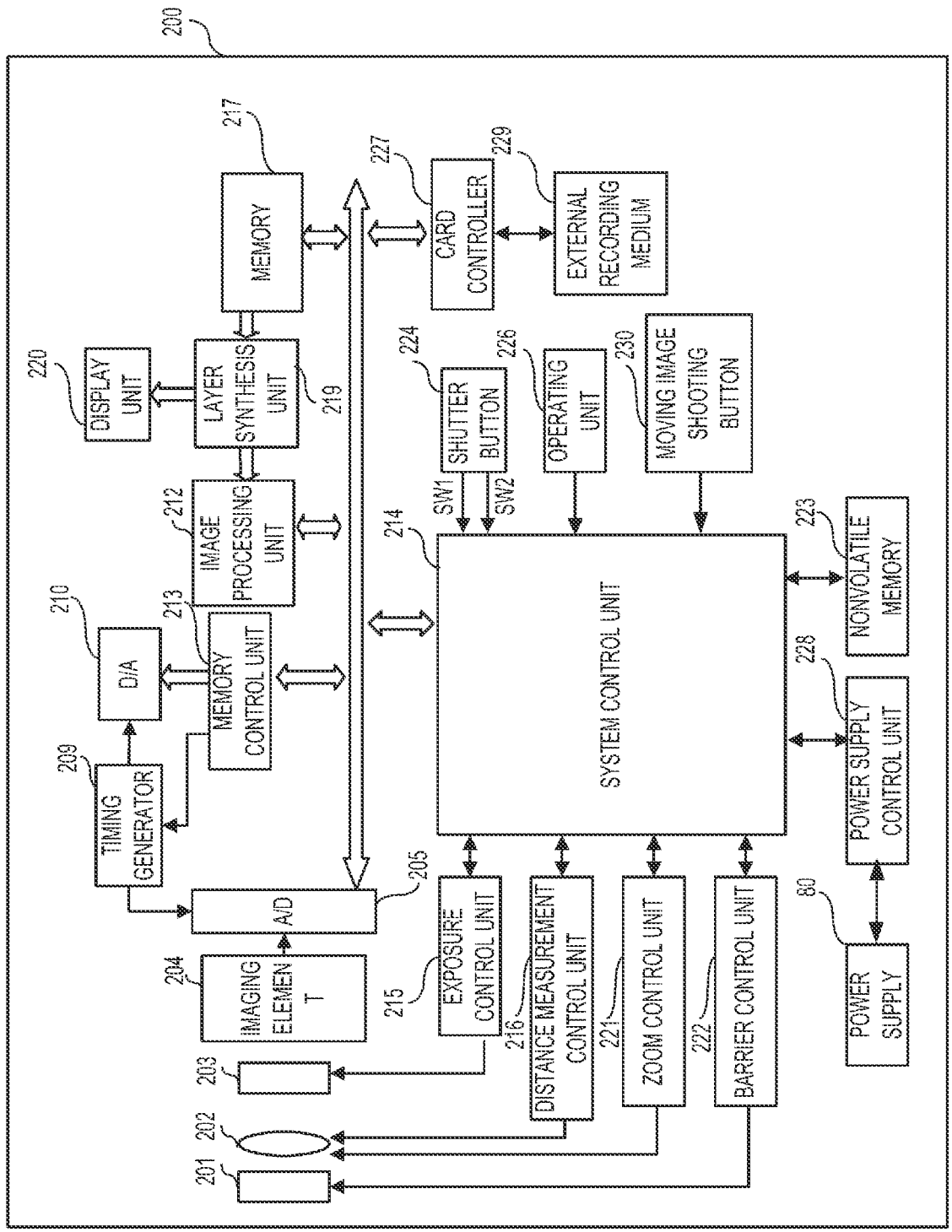
FIG. 2 is a view showing a configuration of the digital camera according to the first embodiment.

FIG. 2 is a view showing a configuration of the digital camera 200 shown in FIG. 1. The digital camera 200 includes a barrier 201, an imaging lens 202, a shutter 203, an imaging element 204, an A/D converter 205, a timing generator 209, a D/A converter 210, an image processing unit 212, and a memory control unit 213. The digital camera 200 also includes a system control unit 214, an exposure control unit 215, a distance measurement control unit 216, a memory 217, a layer synthesis unit 219, the display unit 220, a zoom control unit 221, a harder control unit 222, a nonvolatile memory 223, and the operating unit 226, The digital camera 200 further includes a power supply 80, a card controller 227, a power supply control unit 228, and the moving image shooting button 230.

The barrier 201 is a protective unit that covers an imaging unit including the imaging lens 202. The barrier 201 prevents soiling and breakage of the imaging unit. The imaging lens 202 is a lens unit on which a replaceable imaging lens is mounted. The shutter 203 is capable of freely controlling the exposure time of the imaging element 204 under the control of the exposure control unit 215.

The imaging element 204 (image sensor) includes a CCD, a CMOS element, or the like for converting an optical image into an electric signal. The imaging element 204 is capable of acquiring a static image to be recorded in the memory 217 and a display image, which is a video to be displayed on the display unit 220, The imaging element 204 outputs an image acquired by shooting an object as an analog signal.

The A/D converter 205 converts the analog signal (an image signal) output from the imaging element 204 into a digital signal (data; image data). The D/A converter 210 converts a digital signal (an image; image data) output from the memory control unit 213 into an analog signal.

The timing generator 209 is a circuit for supplying clock signals and control signals to the imaging element 204, the A/D converter 205, and the D/A converter 210. The timing generator 209 is controlled by the memory control unit 213 and the system control unit 214.

The image processing unit 212 performs various types of image processing and/or detection processing on an image (data) output from the A/D converter 205 or an image output from the memory control unit 213. Further, when the image processing unit 212 performs predetermined calculation processing using the image output from the imaging element 204, the system control unit 214 controls the exposure control unit 215 and the distance measurement control unit 216 on the basis of the calculation result. Thus, AF (autofocus) processing, AF (automatic exposure) processing. EF (electronic flash pre-emission) processing, face detection processing, or individual authentication processing is performed. Furthermore, the image processing unit 212 reads an image stored in the memory 217, performs compression processing or expansion processing thereon using the JPEG method or the MPEG-4 AVC/H.264 method, and writes the processed image to the memory 217.

The memory control unit 213 controls the A/D converter 205. the timing generator 209, the image processing unit 212, the D/A converter 210, and the memory 217. Accordingly, an image output from the A/D converter 205 is written to the memory 217 via the image processing unit 212 and the memory control unit 213. Alternatively, the image output from the A/D converter 205 is written to the memory 217 directly via the memory control unit 213.

The layer synthesis unit 219 superimposes a layer on an image output from the memory 217. Here, the layer may be a display item indicating that the image is in a recorded state, a display item indicating a time, a display item representing a frame, or the like.

The display unit 220 displays the image on which the layer has been synthesizes by the layer synthesis unit 219. By displaying images output from the imaging element 204 successively using the display unit 220, it is possible to realize live video display (an electronic viewfinder function; live view).

The memory 217 stores captured static images and moving images (videos). The memory 217 has a sufficient storage capacity for storing a predetermined number of static images and moving images of a predetermined length. Further, the system control unit 214 can use the memory 217 as a working area.

The exposure control unit 215 controls the shutter 203. The distance measurement control unit 216 controls focusing by the imaging lens 202. The zoom control unit 221 controls zooming (enlargement/reduction) by the imaging lens 202. The barrier control unit 222 controls the operation of the barrier 201 serving as a protective unit.

The system control unit 214 includes a CPU or the like for controlling the entire digital camera 200. The system control unit 214 can control the respective function units by executing a program recorded in the nonvolatile memory 223. The system control unit 214 is also capable of reading the display image (the video) from the imaging element 204 in frame units.

An electrically erasable/recordable memory such as an EEPROM is used as the nonvolatile memory 223. Alphabetic character information and so on are recorded in the nonvolatile memory 223 in addition to the program.

The operating unit 226 is constituted by operating members that are used by the user to input various operating instructions into the system control unit 214. The operating unit 226 includes at least one of a button, a touch panel, a gaze detection device (a device for detecting a location at which the user is looking), a voice recognition device, and so on. Here, the button may be a power supply button, a menu button, a mode switch, a 4-direction key, a set button, a macro button, a flash setting button, a menu moving button, a playback image moving button, an image quality selection button, an exposure correction button, a date/time setting button, and so on. Note that the mode switch is a switch for alternating between an imaging mode, a playback mode, and other special imaging modes, for example.

The shutter button 224 can be pressed in two stages, namely half-pressed and fully pressed. The shutter button 224 may therefore be said to include two operating members, namely an operating member for receiving half depression and an operating member for receiving full depression. When half-pressed by the user, the shutter button 224 generates a shutter signal SW1 and transmits the shutter signal SW1 to the system control unit 214. Upon receipt of the shutter signal SW1, the system control unit 214 starts an operation such as AF (autofocus) processing, AE (automatic exposure) processing, AWB (automatic white balance) processing, or EF (electronic flash pre-emission) processing.

Further, when fully pressed by the user, the shutter button 224 generates a shutter signal SW2 and transmits the shutter signal SW2 to the system control unit 214. Upon receipt of the shutter signal SW2, the system control unit 214 starts an operation (an imaging operation) constituted by a series of processes for subjecting the analog signal read from the imaging element 204 to exposure processing, development processing, and recording processing.

Here, the exposure processing is processing for reading the analog signal from the imaging element 204 and writing the read analog signal to the memory 217 via the A/D converter 205 and the memory control unit 213 as an image in a RAW data format or the like. Further, the development processing is processing for reading the image (image data) subjected to the exposure processing from the memory 217, performing expansion processing to the JPEG method or the MPEG-4 AVC/H.264 method thereon using the image processing unit 212, and then writing the image back to the memory 217. Furthermore, the storage processing is processing for reading the image subjected to the development processing from the memory 217, performing compression processing thereon using the image processing unit 212, and then writing the image to the memory 217 or to the external recording medium 229 via the card controller 227.

The power supply 80 includes a primary battery (an alkali battery, a lithium battery, or the like), a secondary battery (an NiCd battery, NiMH an battery, an Li battery, or the like), an adapter for connecting to an external power supply, or the like.

The card controller 227 exchanges images (data) with the external recording medium 229, which is constituted by a memory card or the like.

<Operation of Digital Camera During Continuous Imaging>: Next, an operation of the digital camera 200 (the display control device) during continuous imaging according to the first embodiment will be described using a flowchart shown in FIG. 3 and a timing chart shown in FIG. 4.

Figure 3:
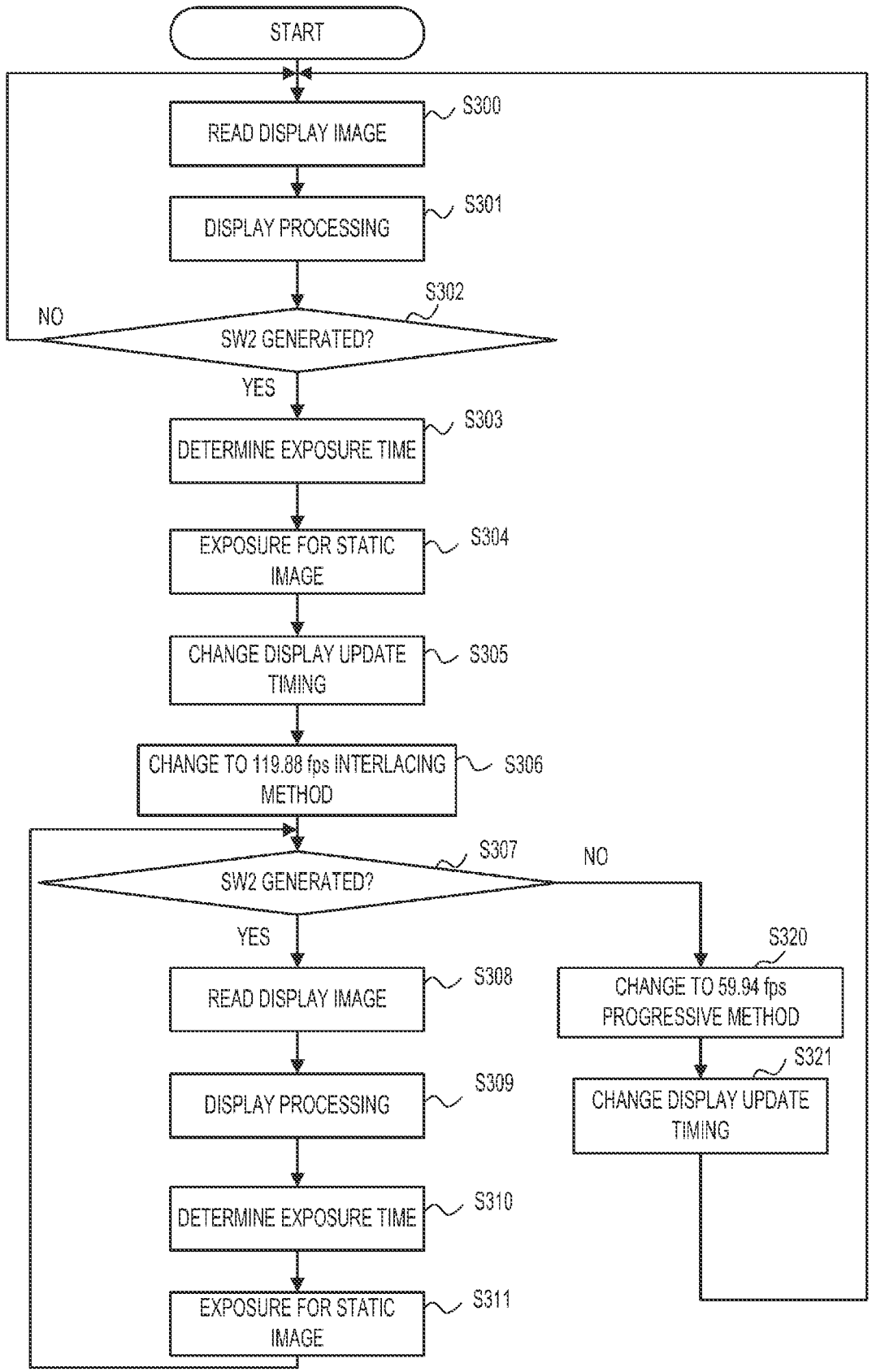
FIG. 3 is a flowchart showing an operation performed during continuous imaging according to the first embodiment.

FIG. 3 is a flowchart showing a flow of this embodiment in a case where the display method employed when continuously capturing static images is the "interlacing method" and a display delay (the time interval between reading and display of the display image) is controlled so as to be constant in each frame. The processing of the flowchart shown in FIG. 3 is realized by having the system control unit 214 execute the program stored in the nonvolatile memory 223.

In S300, the system control unit 214 controls the imaging element 204 so as to read (acquire) the display image (a single frame of a video) at 59.94 fps (at fixed time intervals; periodically). The display image is expanded to the memory 217 by the memory control unit 213 via the A/D converter 205 and the image processing unit 212.

Figure 4:
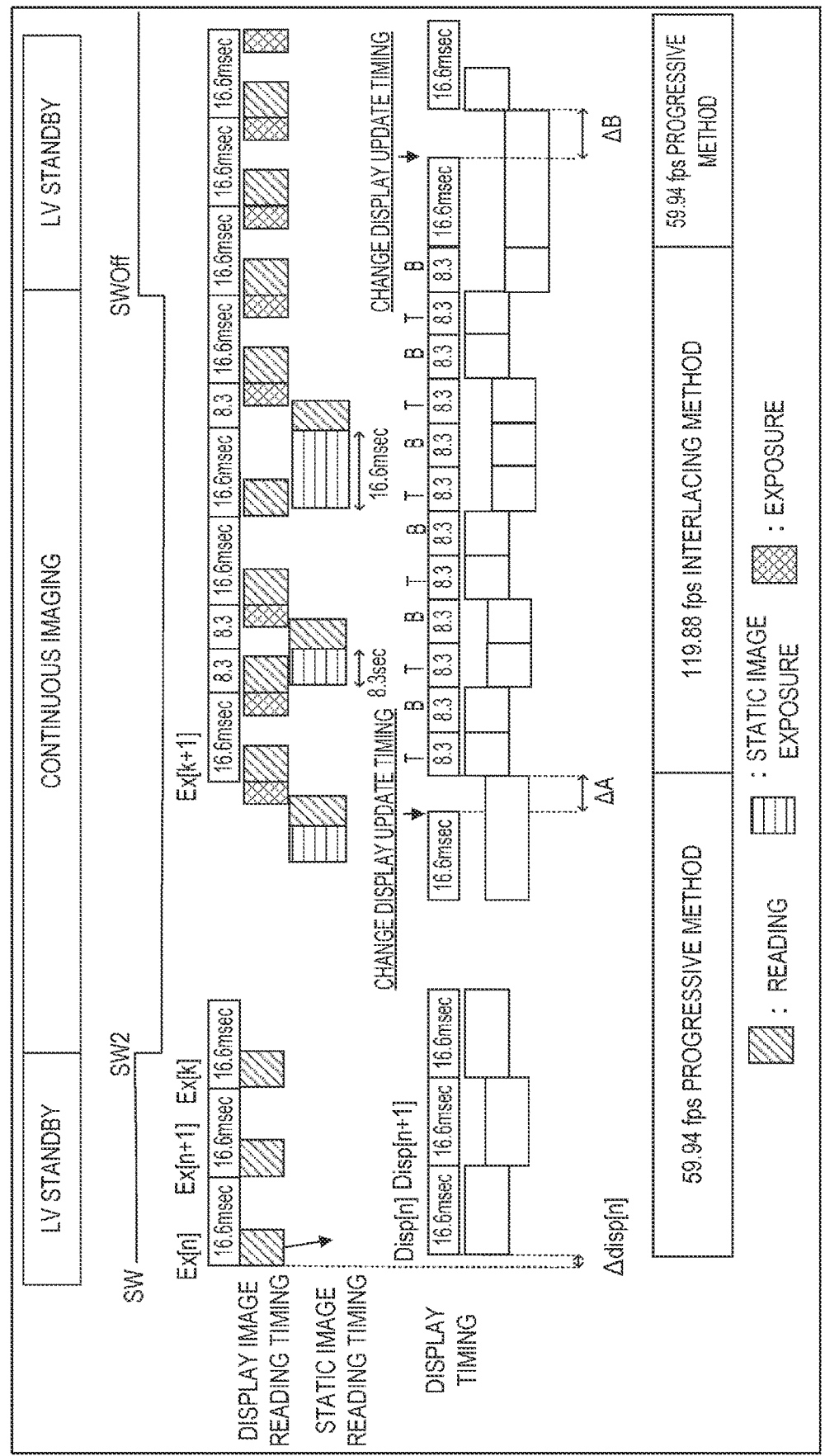
FIG. 4 is a timing chart of continuous imaging according to the first embodiment.

In S301, the system control unit 214 transfers the display image expanded to the memory 217 to the display unit 220 so as to display the display image on the display unit 220. FIG. 4 is a timing chart showing time relationships between the start of reading and the start of display of the display image. When the reading start time of an n-th frame is set as Ex[n] and the display start time of the n-th frame is set as Disp[n], a display delay time Δdisp[n] constituting an interval between the two times is Disp[n]−Ex[n]. Further, in this embodiment, reading and display of the display image are driven at the same rate of 59.94 fps. In other words, the frame update rate in S301 is the same as the frame rate at which the display images are shot. Accordingly, Ex[n]−Ex[n−1]=Disp[n] Disp[n−1]=16.7 msec. In S301, the display image is displayed at a display update rate of 59.94 fps and using the "progressive method" as the display method.

In S302, the system control unit 214 determines whether or not the user has fully pressed the shutter button 224 (in other words, whether or not SW2 has been generated). When SW2 has been generated, the processing advances to S303, and when SW2 has not been generated, the processing returns to S300. Here, fully pressing the shutter button 224 is an operation for issuing an instruction to continuously shoot static images.

In S303, the system control unit 214 determines the exposure time for a case in which a static image is to be shot. In this embodiment, as shown in FIG. 4, the exposure time for a static image during continuous imaging is not a constant value and may be extended or reduced as desired (in accordance with the brightness of the object) to any multiple of 8.3 msec.

In S304, the system control unit 214 controls the exposure control unit 215 to perform exposure processing for shooting a static image for the duration of the exposure time determined in S303. At this time, as shown in FIG. 4, the reading start time of the display image prior to the generation of SW2 (immediately before SW2 is generated) is set as Ex[k], and the reading start time following exposure in S304 is set as Ex[k+1], in this embodiment, the system control unit 214 controls the exposure start time of the static image so that Ex[k+1]−Ex[k]=500 msec. Here, the system control unit 214 controls the exposure start time of the static image so that regardless of the timing at which the user fully presses the shutter button 224, the time from full depression to reading of the static image remains constant. Note that the system control unit 214 performs control (recording control) to record (read) the static image captured as a result of the exposure processing in the memory 217.

In S305, as shown in FIG. 4, the system control unit 214 shills the display update timing of the display unit 220 by ΔA from the original display end timing of the previous frame (a timing 16.7 msec from the start of display). Note that ΔA is (Ex[k+1]−Ex[k])% 16.7 msec (a time corresponding to the remainder of dividing Ex[k+1]−Ex[k]=500 msec by 16.7 msec).

In S306, the system control unit 214 changes the display mode during the continuous imaging. More specifically, the system control unit 214 changes the display update rate to 119.88 fps and changes the display method to the "interlacing method". When the display method is changed to the "interlacing method", the resolution decreases, but the power consumption required for image display can be suppressed. Hence, by changing to the "interlacing method", the digital camera 200 can secure power for recording the static image. In S306, even when the exposure time for shooting the static image has been extended, the display delay time (the time between reading and display of the display image) is kept constant in each frame. In FIG. 4, "T" represents display of the display image using the odd-numbered lines, and "B" represents display of the display image using the even-numbered lines.

By changing the display method after shifting the display update timing in this manner, the time between reading and display of the display image can be kept constant when the "interlacing method" is employed, and the display interval of the display image (the display time of a single static image) can be fixed. Hence, even when shooting a moving object, display can be performed so that the movement of the moving object does not produce a feeling of discomfort in the user.

In S307, the system control unit 214 determines whether or not the user has fully pressed the shutter button 224 (in other words, whether or not SW2 has been generated; whether or not full depression has been released). When SW2 is generated, the processing advances to S308, and when SW2 is not generated, the processing advances to S320. Here, the release of full depression of the shutter button 224 is an operation for canceling continuous imaging of static images.

In S308, the system control unit 214 controls the imaging element 204 so as to read the display image at 118.94 fps. The display image is expanded to the memory 217 by the memory control unit 213 via the A/D converter 205 and the image processing unit 212.

In S309, the system control unit 214 transfers the display image expanded to the memory 217 to the display unit 220 so as to display the display image on the display unit 220.

In S310, the system control unit 214 determines the exposure time for shooting a static image. As described above, the exposure time can be extended or reduced in multiples of 8.3 msec.

In S311, the system control unit 214 controls the exposure control unit 215 to perform exposure for the exposure time determined in S310.

In S320, the system control unit 214 returns the display mode at a timing at which display of the display image on the even-numbered lines ends. In other words, the system control unit 214 returns (changes) the display update rate to 59.94 fps, and returns the display method to the "progressive method".

In S321, the system control unit 214 shifts the display update timing by ΔB in order to align the subsequent display delay time with the display delay time Δdisp[n] prior to the start of the continuous imaging. As a result, the display delay time is kept constant even after the end of the continuous imaging.

By shifting (changing) the display update timing after returning the display method to the "progressive method" in S320 in the manner described above, the display interval established in the "interlacing method" is fixed, and therefore the display time of the odd-numbered or even-numbered lines does not lengthen. As a result, the continuous imaging processing can be completed without causing flickering to occur when the display image is displayed as a moving image.

Figure 6:
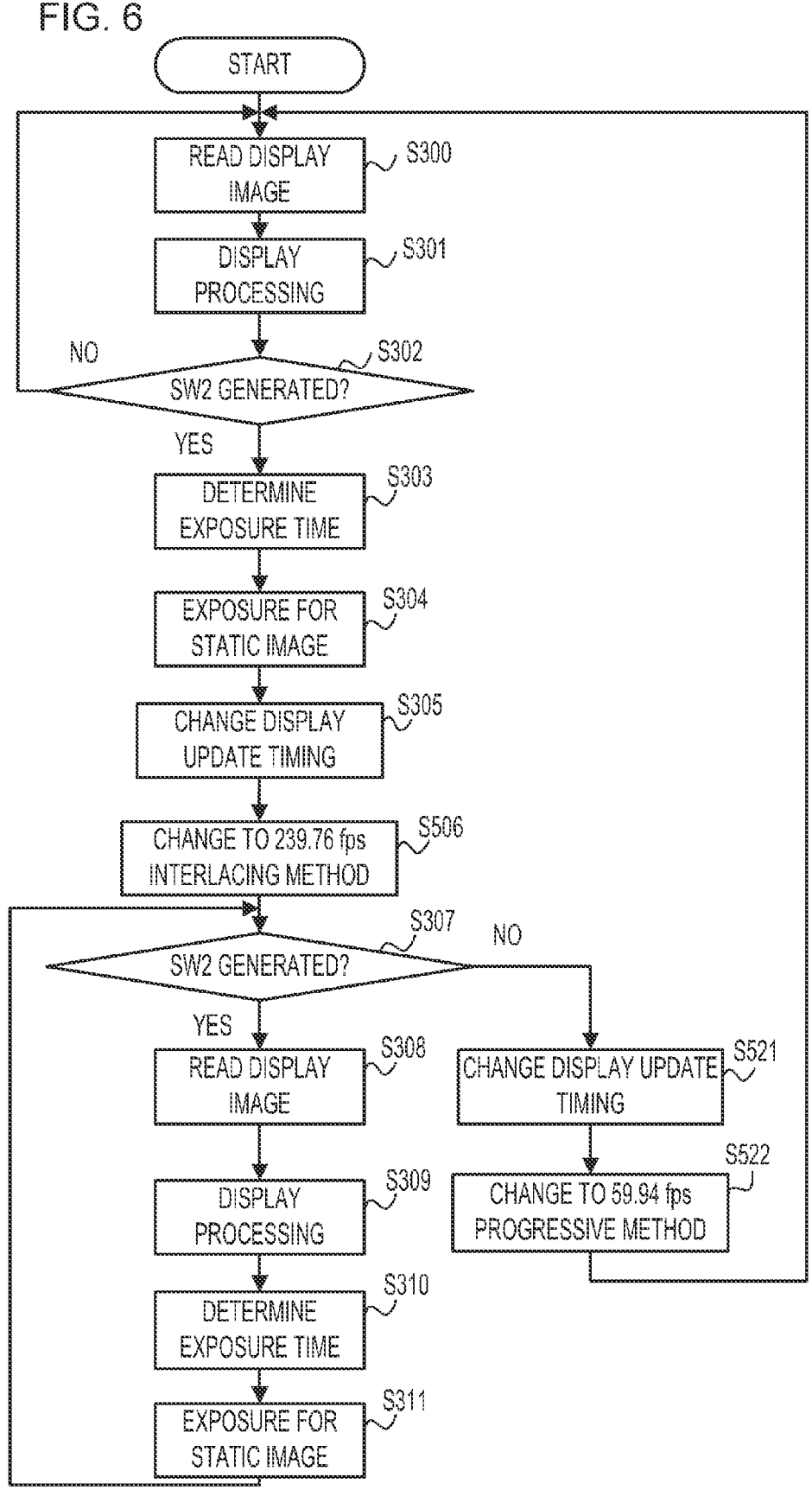
FIG. 6 is a flowchart showing an operation performed during continuous imaging according to the second embodiment.

[Second Embodiment]: In the digital camera 200 to be described in a second embodiment, during continuous imaging, the display update rate is changed to 239.76 fps and the display method is changed to the "interlacing method". An operation performed by the digital camera 200 during continuous imaging will be described below using FIG. 6. Note that the processing performed in S301 to S305 and S307 to S311 is similar to the processing of the first embodiment, shown on the flowchart in FIG. 3, and therefore description thereof has been omitted.

In the second embodiment, when the processing of S305 is complete, the processing advances to S506. Further, in S307, the processing advances to S308 when SW2 is generated and advances to S521 when SW2 is not generated.

Figure 5:
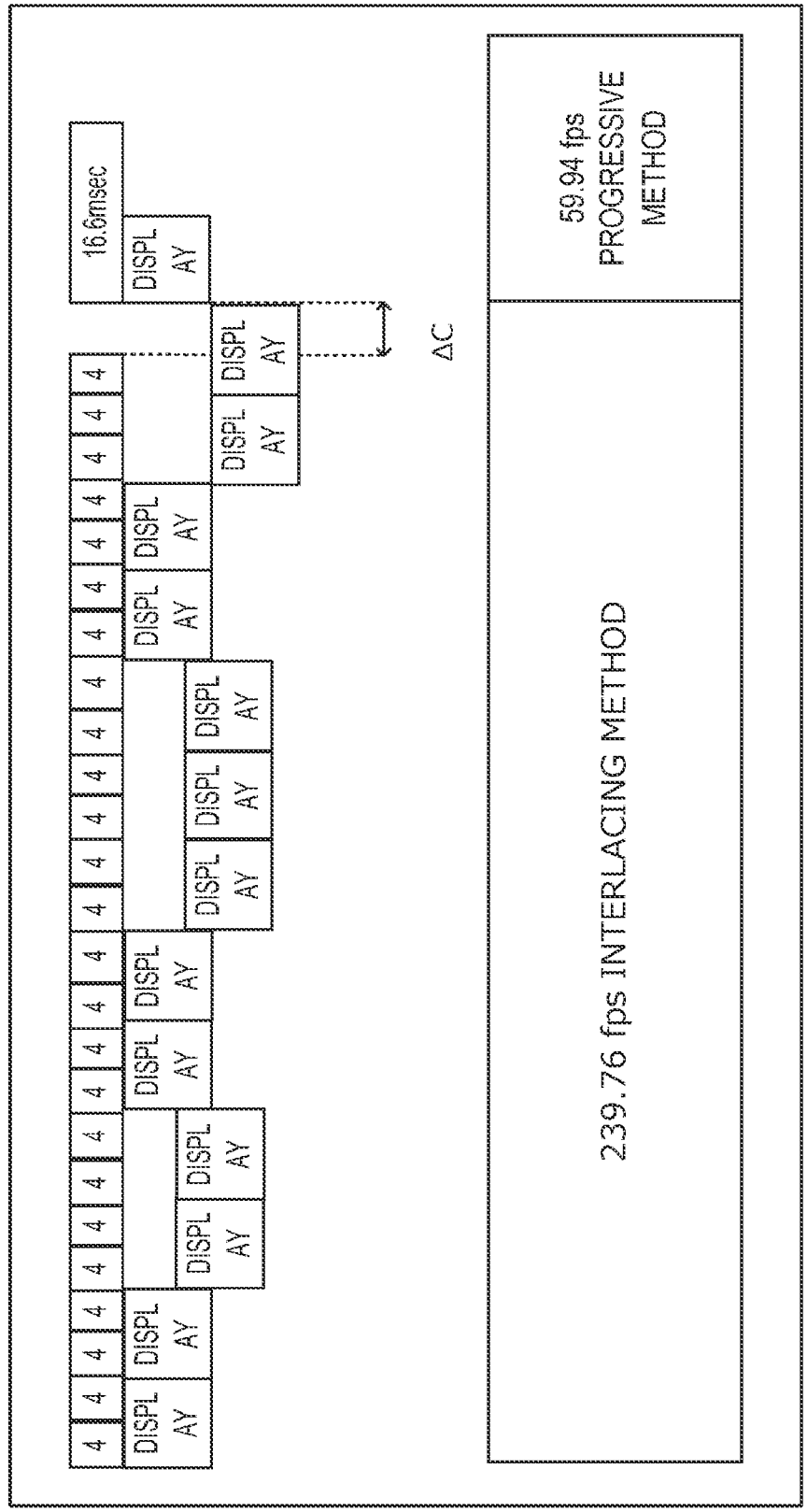
FIG. 5 is a timing chart of continuous imaging according to a second embodiment.

In S506, as shown in FIG. 5, the system control unit 214 changes the display update rate to 239.76 fps and changes the display method to the "interlacing method" during the continuous imaging.

In S521, as shown in FIG. 5, the system control unit 214 shifts the display update timing by ΔC in order to align the subsequent display delay time with the display delay time Δdisp[n] prior to the start of the continuous imaging. At this time, the system control unit 214 determines whether or not the sum of ΔC and 4.15 msec (the display time of a single frame at 239.76 fps) exceeds 8.3 msec (a time corresponding to 119.88 fps). Here, when the sum of ΔC and 4.15 msec exceeds 8.3 msec, the system control unit 214 shifts the display update timing by 4.15 msec of ΔC. The system control unit 214 then shifts the display update timing by the excess (the remainder) when displaying the next display image at 239.76 fps.

In S522, at the timing at which display of the display image on the even-numbered lines ends. the system control unit 214 returns the display update rate to 59.94 fps and returns the display method to the "progressive method".

Hence, when the display update rate is 239.76 fps, the display method is returned to the "progressive method" after shifting the display update timing. Note that in this embodiment, the display update rate is 239.76 fps, but the display method may also be returned to the "progressive method" after shifting the display update timing in a case where the display update rare equals or exceeds 239.76 fps (equals or exceeds a predetermined value), According to this embodiment, the display update timing is adjusted so as to be extended only to a maximum of 8.3 msec, and therefore the possibility of flickering being visible to the user is reduced. Moreover, by shifting the display update timing in advance, the frequency with which the detection image is stopped following the continuous imaging can be reduced.

Note that in the embodiments described above, when a video is displayed using the "interlacing method", data. of the odd-numbered rows of a single frame of the video are displayed on the odd-numbered lines, whereupon data of the even-numbered rows of the single frame are displayed on the even-numbered lines. Here, instead of the "interlacing method", any other desired display method with which the vertical resolution is lower than that of the "progressive method" may be used. For example, a "doubler method" or a "Mars method" may be used instead of the "interlacing method". In the "doubler method", when the data of the odd-numbered rows are displayed, the data are displayed not only on the odd-numbered lines but also on the even-numbered lines immediately therebelow, and when the data of the even-numbered rows are displayed, the data are displayed not only on the even-numbered lines but also on the odd-numbered lines immediately thereabove. In the "Mars method", when the data of the odd-numbered rows are displayed, the data are displayed not only on the odd-numbered lines but also on the even-numbed lines immediately thereabove, and when the data of the even-numbered rows are displayed, the data are displayed not only on the even-numbered lines but also on the odd-numbered lines immediately thereabove. In the "Mars method", when the data of the odd-numbered rows are displayed, the data. may be displayed not only on the odd-numbered lines but also on the even-numbered lines immediately therebelow, and when the data of the even-numbered rows are displayed, the data may be displayed not only on the even-numbered lines but also on the odd-numbered lines immediately therebelow.

Hence, with all of the "interlacing method", the "doubler method", and the "Mars method", display using only the data of the odd-numbered rows is performed on odd-numbered frames, and display using only the data of the even-numbered rows is performed on even-numbered frames. In other words, a video is displayed by switching between display using only the data. of the odd-numbered rows of one frame of the video and display using only the data of the even-numbered rows of one frame of the video.

According to the present invention, a user can perform image capture as intended, without feeling discomfort.

<Other Embodiments>: Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-014917, filed on Feb. 2, 2021, which is hereby incorporated by reference herein in its entirety.

What is claimed is:

1. A display control device for controlling a display panel that is switchable between a first display mode in which a video is displayed at a first vertical resolution and a second display mode in which a video is displayed at a second vertical resolution that is lower than the first vertical resolution,
   the display control device comprising at least one memory and at least one processor which function as:
   a control unit configured, in a first case where a first operation is received in the first display mode, to change to the second display mode after changing a display update timing in the first display mode, and in a second case where a second operation is received in the second display mode, to change the display update timing after changing to the first display mode, wherein
   in the first display mode, the display panel displays the video using a progressive method, and
   in the second display mode, the display panel displays the video by switching between a first display using a part of data in one frame of the video and a second display using a part of the data.

2. The display control device according to claim 1, wherein a display update rate in the second display mode is higher than a display update rate in the first display mode.

3. The display control device according to claim 1, wherein a display update rate in the first display mode is equal to a frame rate at which the video is captured.

4. The display control device according to claim 1, wherein, in the second case, in a case where a display update rate of the second display mode equals or exceeds a predetermined value, the control unit changes the display update timing in the second display mode and then changes to the first display mode.

5. The display control device according to claim 1, wherein the at least one memory and the at least one processor further function as a recording control unit configured to record in a storage a plurality of static images captured continuously in the second display mode.

6. The display control device according to claim 1, further comprising an image sensor configured to acquire the video of an object,
wherein the control unit reads the video from the image sensor for each frame.

7. The display control device according to claim 1, wherein, in the first case, the control unit changes the display update timing so that a display time of each frame of the video in the second display mode is constant.

8. The display control device according to claim 1, wherein
the first operation is depression of a predetermined operating member, and
the second operation is release of the depression of the predetermined operating member.

9. The display control device according to claim 1, wherein
the first operation is an operation for instructing continuous shooting of static images, and
the second operation is an operation for canceling continuous shooting of static images.

10. The display control device according to claim 1, wherein
the first display and the second display are different from each other.

11. The display control device according to claim 1, wherein
the first display is a display using data of odd numbered rows of one frame of the video, for odd lines of the display panel as well as even lines of the display panel, or a display using data of even numbered rows of one frame of the video, for even lines of the display panel as well as odd lines of the display panel.

12. The display control device according to claim 1, wherein
in the second display mode, the display panel displays the video using one of an interlacing method, a doubler method and a Mars method.

13. A display control device for controlling a display panel that is switchable between a first display mode in which a video is displayed at a first vertical resolution and a second display mode in which a video is displayed at a second vertical resolution that is lower than the first vertical resolution,
the display control device comprising at least one memory and at least one processor which function as:
a control unit configured, in a first case where a first operation is received in the first display mode, to change to the second display mode after changing a display update timing in the first display mode, and in a second case where a second operation is received in the second display mode, to change the display update timing after changing to the first display mode, wherein, the display control device further comprises an image sensor configured to acquire the video of an object,
the control unit reads the video from the image sensor for each frame, and
in the first case or the second case, the control unit changes the display update timing so that a time between reading of each frame of the video from the image sensor and displaying thereof on the display panel is constant.

14. A display control method for controlling a display panel that is switchable between a first display mode in which a video is displayed at a first vertical resolution and a second display mode in which a video is displayed at a second vertical resolution that is lower than the first vertical resolution,
the display control method comprising:
a step for changing to the second display mode after changing a display update timing in the first display mode in a first case where a first operation is received in the first display mode; and
a step for changing the display update timing after changing to the first display mode in a second case where a second operation is received in the second display mode, wherein
in the first display mode, the display panel displays the video using a progressive method, and
in the second display mode, the display panel displays the video by switching between a first display using a part of data in one frame of the video and a second display using a part of the data.

15. A non-transitory computer readable medium that stores a program, wherein the program causes a computer to execute a display control method,
the display control method being a display control method for controlling a display panel that is switchable between a first display mode in which a video is displayed at a first vertical resolution and a second display mode in which a video is displayed at a second vertical resolution that is lower than the first vertical resolution,
the display control method comprising:
a step for changing to the second display mode after changing a display update timing in the first display mode in a first case where a first operation is received in the first display mode; and
a step for changing the display update timing after changing to the first display mode in a second case where a second operation is received in the second display mode, wherein
in the first display mode, the display panel displays the video using a progressive method, and
in the second display mode, the display panel displays the video by switching between a first display using a part of data in one frame of the video and a second display using a part of the data.

16. The display control device according to claim 11, wherein
in the second display mode, the display panel displays the video using a Mars method.

* * * * *